US010183365B2

United States Patent
Dutta

(10) Patent No.: US 10,183,365 B2
(45) Date of Patent: Jan. 22, 2019

(54) METHOD OF MANUFACTURING HIGH-CONDUCTIVITY WEAR RESISTANT SURFACE ON A SOFT SUBSTRATE

(71) Applicant: DM3D TECHNOLOGY, LLC, Auburn Hills, MI (US)

(72) Inventor: Bhaskar Dutta, Troy, MI (US)

(73) Assignee: DM3D Technology, LLC, Auburn Hills, MI (US)

( * ) Notice: Subject to any disclaimer, the term of this patent is extended or adjusted under 35 U.S.C. 154(b) by 176 days.

(21) Appl. No.: 15/103,566

(22) PCT Filed: Dec. 11, 2014

(86) PCT No.: PCT/US2014/069670
§ 371 (c)(1),
(2) Date: Jun. 10, 2016

(87) PCT Pub. No.: WO2015/089252
PCT Pub. Date: Jun. 18, 2015

(65) Prior Publication Data
US 2016/0311071 A1    Oct. 27, 2016

Related U.S. Application Data

(60) Provisional application No. 61/915,810, filed on Dec. 13, 2013.

(51) Int. Cl.
*B23K 26/34* (2014.01)
*B23P 15/00* (2006.01)
(Continued)

(52) U.S. Cl.
CPC ............ *B23P 15/001* (2013.01); *B23K 9/044* (2013.01); *B23K 9/232* (2013.01); *B23K 10/027* (2013.01);
(Continued)

(58) Field of Classification Search
CPC . F01L 3/22; F01L 2103/00; F01L 3/02; F01L 3/04; F01L 2101/00; Y10T 29/4927;
(Continued)

(56) References Cited

U.S. PATENT DOCUMENTS

| | | | |
|---|---|---|---|
| 2001/0001641 A1* | 5/2001 | Ninomiya | B23K 31/025 420/485 |
| 2003/0189086 A1* | 10/2003 | Clay | B23K 35/262 228/223 |
| 2005/0002823 A1* | 1/2005 | Bass | C22C 9/05 420/487 |

* cited by examiner

*Primary Examiner* — Jun Yoo
(74) *Attorney, Agent, or Firm* — Warner Norcross + Judd LLP

(57) ABSTRACT

A method of forming a valve seat of an engine head formed from a first composition includes forming a groove at a predetermined valve seat location of a bore defined by the engine head. A source of directed heat energy preheats at least the valve seat location to about a temperature of the melting point of the first composition with the source of directed heat energy. The source of directed heat energy is infused with a material having a second composition generating a melt pool upon the groove by direct metal deposition with the melt pool including the second composition. The second composition includes a heat conductivity generally equal to a heat conductivity of the first composition for providing efficient transfer of heat energy from the first composition to the second composition.

14 Claims, 2 Drawing Sheets

(51) Int. Cl.
| | |
|---|---|
| *F01L 3/02* | (2006.01) |
| *C22C 21/00* | (2006.01) |
| *C22C 21/14* | (2006.01) |
| *C22C 30/02* | (2006.01) |
| *B23K 26/342* | (2014.01) |
| *B23K 9/04* | (2006.01) |
| *B23K 9/23* | (2006.01) |
| *B23K 10/02* | (2006.01) |
| *B23K 26/00* | (2014.01) |
| *F02F 1/24* | (2006.01) |
| *B23K 103/12* | (2006.01) |

(52) U.S. Cl.
CPC ........ *B23K 26/0006* (2013.01); *B23K 26/342* (2015.10); *C22C 21/00* (2013.01); *C22C 21/14* (2013.01); *C22C 30/02* (2013.01); *F01L 3/02* (2013.01); *F02F 1/24* (2013.01); *B23K 2103/12* (2018.08); *F01L 2103/00* (2013.01)

(58) Field of Classification Search
CPC ......... Y10T 29/49272; Y10T 29/49302; Y10T 29/49863; Y10T 29/49865; Y10T 29/49306; Y10T 29/49314; Y10T 29/49409; Y10T 29/49995; Y10T 29/4998; Y10T 29/49982; Y10T 29/49986; B23K 2203/12; B23K 10/027; B23K 26/00; B23K 26/0006; B23K 26/0093; B23K 26/34; B23K 26/342; B23K 26/323; B23K 26/32; B23K 2203/18–2203/26; B23K 9/044; B23K 9/232

See application file for complete search history.

METHOD OF MANUFACTURING HIGH-CONDUCTIVITY WEAR RESISTANT SURFACE ON A SOFT SUBSTRATE

CROSS-REFERENCE TO RELATED APPLICATIONS

This application is the National Stage application of International Application No. PCT/US2014/069670, filed Dec. 11, 2014, which claims priority to U. S. provisional patent application Ser. No. 61/915,810, filed Dec. 13, 2013, the entire content of which is incorporated herein by reference.

TECHNICAL FIELD

The present invention relates generally toward an application of a durable metallic material onto desired locations of a soft metallic substrate. More specifically, the present application is directed toward direct metal deposition of a first composition having desirable physical properties onto a second composition having different physical properties.

BACKGROUND

Lightweight materials are being used to reduce mass of automotive vehicle on an ever-increasing basis. While lightweight materials are desirable to reduce mass, these materials do not often offer necessary durability to withstand the rigors known to automotive vehicles. For example, aluminum is being used to cast engine heads to provide a lightweight power train to an automotive vehicle. However, a valve seat of a bore formed in an aluminum engine head required for properly sealing a valve of an internal combustion engine does not provide necessary durability. Repeated thermal and load cycles on these valve seats demand a durable material capable of withstanding temperatures between 375° C. to 700° C. while providing sufficient oxidation and wear resistance. Most commercial engine valves use powder metallurgy fabricated steel inserts that are held in place within a valve pocket by way of interference fit. However, while adequate wear resistance has been achieved, other properties such as, for example sufficient, heat conductivity necessary to dissipate heat energy has not been achieved.

Other attempts to improve the performance of a valve seat have included the use of different metallic alloys applied by using lasers, welding, or a thermal spray processes. Many of these efforts have relied on using a high energy laser beam with injected powder metal to form the valve seat on the engine block after which the deposited alloy is machined into a desired configuration. However, these efforts have also proven deficient. Poor process control that does not account for temperature differentials between the engine block and a melt pool formed by the deposited alloy during both application and subsequent cooling have resulted in deficient performance. Often, this has resulted in excessive liquidation of a substrate causing cracking, porosity, and poor quality of the deposited alloy. Additionally, known alloys used to form the valve seat have not provided desirable heat conductivity properties required of high performance internal combustion engines. Therefore, it would be desirable to provide an improved method of forming a valve seat along with an improved alloy composition providing desirable mechanical properties.

SUMMARY

A method of forming a valve seat of an engine head that is formed from a first composition includes forming a groove at a predetermined valve seat location on a wall of a bore defined by the engine head. A source of directed heat energy preheats at least the valve seat location to about a temperature of the melting point of the first composition using the source of directed heat energy. A source of the directed heat energy is infused with material having a second composition generating a melt pool upon the groove by way of direct metal deposition. The melt pool includes the second composition. The second composition includes a heat conductivity generally equal to or higher than the heat conductivity of the first composition for providing efficient transfer of heat energy from the second composition to the first composition while the engine head is in service.

Two aspects of the present invention overcome problems associated with the prior art of depositing a molten valve seat onto an engine head. For example, preheating the valve seat location to about the temperature of the melting point of the alloy comprising the engine head reduces the temperature differential during application and subsequent cooling of the molten valve seat that is known to cause defects. Additionally, the composition of the valve seat provides unique enhanced durability properties while facilitating the transfer of heat from the valve seat to the engine block while the engine block is in service. Improved heat conductivity of the inventive composition of the present application provides the benefit of cooling the valve seat in an efficient manner making optimal use of the cooling features included in the engine head.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION

Figure 1:
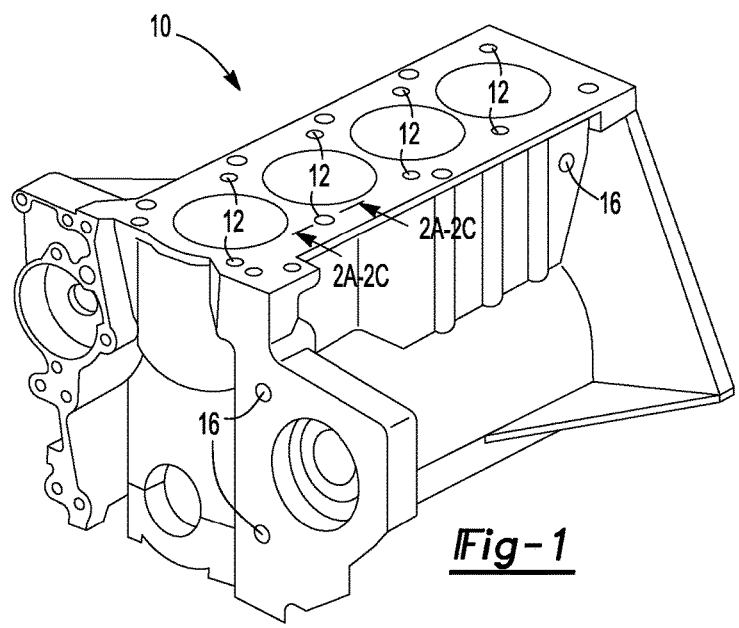
FIG. 1 shows a perspective view of an engine head.

Referring to FIG. 1, an engine head for an internal combustion engine is generally shown at 10. The engine head 10 is formed of an aluminum alloy in a known manner providing a lightweight solution for reducing mass of an internal combustion engine associated with powertrain of an automotive or other vehicle. It should be understood by those of ordinary skill in the art that the description of a valve seat of an internal combustion engine is merely exemplary and the present invention may be used on other components requiring efficient heat transfer and wear resistance. The engine head 10 includes a plurality of bores 12 that receive a valve seat 14 against which an intake or exhaust valve (not shown) rests during the portion of the engine operating cycle when the valve is closed. Therefore, the valve seat 14 is subject to intense heat from internal combustion and wear from opening and closing the valve.

The engine head 10 includes a cooling line 16 through which engine coolant flows to prevent the engine head 10 from overheating. Therefore, it is desirable that the valve seat 14 provide sufficient heat transfer to the engine head 10 so that the coolant flowing through the coolant lines 16 provides sufficient heat dissipation to the valve seat 14. It has been determined that it is desirable to have the heat conductivity value of the valve seat 14 to be generally equivalent to that of the engine head 10.

Figure 2A:
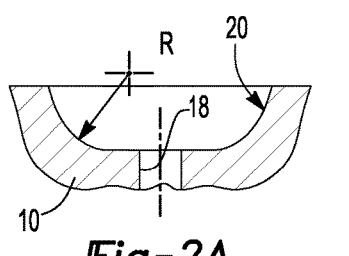
FIGS. 2A-2C show cross-sectional views of a valve seat groove formed in the engine head.
Figure 2B:
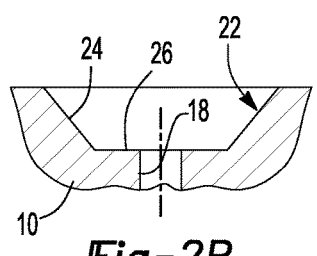
Figure 2C:
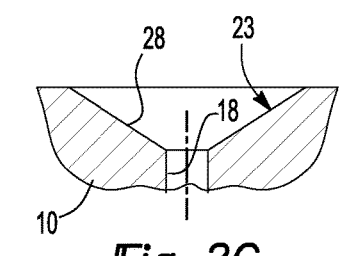

Referring now to FIG. 2A-C, a bore wall 18 is shown with alternative valve seat grooves 20, 22, 23. As best represented in FIG. 2A, the first valve seat groove 20 is shown having a generally constant radius R. The generally constant radius R ranges from about 3 millimeters to 10 millimeters, the value of which is dependent upon the desired application. As best represented in FIG. 2B, the second, or alternative, valve seat groove 22 is represented as a chamfered wall 24 having a normal wall 26 that is substantially perpendicular to the bore wall 18. The angle of the chamfered wall 24 to the normal wall 26 ranges between 30° and 70°, which is dependent up on the physical needs of a particular application. The third, or additional alternative embodiment, valve seat groove 23 is best represented in FIG. 2C as an alternative chamfer wall 28 that intersects directly with the bore wall 18.

Figure 3:
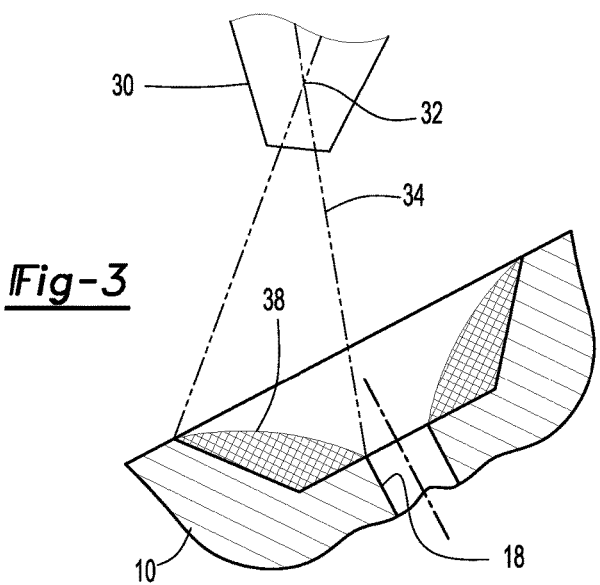
FIG. 3 shows a schematic view source of heat energy directed at a the valve seat groove.

Referring now to FIG. 3, a source of directed heat energy such as, for example, a laser, a welding arch, or a plasma jet is directed through a nozzle 30. The heat source covers substantially all of the valve seat groove 20, either in a single pass or multiple number of passes to heat the valve seat groove to about the temperature of the melting point of a first composition used to form the engine head 10. Therefore, in the event a laser is used, a focal point 32 of a laser beam 34 is contemplated to be spaced from the surface 36 of the valve seat groove 20 spaced a sufficient distance to known provide necessary heat energy. Should the engine head 10 be formed from an aluminum alloy, it is contemplated that the surface 36 of the valve seat groove 20 is heated to between about 250° C. and 450° C. in a preheating step to reduce the heat differential between the substrate of engine head and the formation of the melt pool. It is further contemplated that the surface of the valve seat groove 20 is melted by the source of directed heat energy raising the temperature of the surface of the valve seat to between 550° C. and 660° C., the purpose of which will be explained further below.

Figure 4:
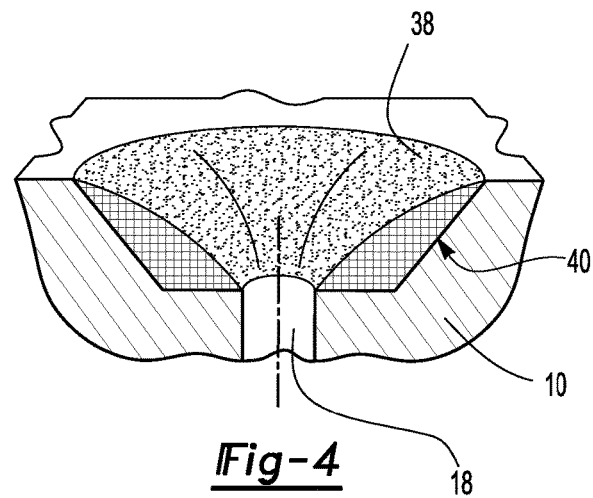
FIG. 4 shows a cross-sectional view of a deposited valve seat.

A second composition forming the valve seat alloy is injected into the nozzle 30 in the form of a powder, or wire. A melt pool 38 is generated at the location of the valve seat 14, as best represented in FIG. 4, from the second composition in the manner similar to that disclosed in U.S. Pat. No. 6,122,564, the content of which is included herein by reference. A dilution zone 40 is formed by melting the valve seat groove 20. The dilution zone 40 forms a transitional alloy between the composition of which forms the melt pool 38 and the alloy composition of the engine head 10. Therefore, transfer of heat from the valve seat 14 to the engine head 10 is efficient, unlike that of a mechanically-inserted valve seat, which generally includes a gap between the valve seat and an engine head 10.

Figure 5A:
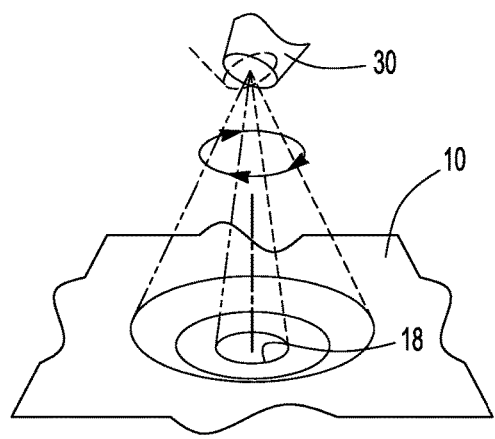
FIGS. 5A and 5B show alternative methods of depositing the valve seat.
Figure 5B:
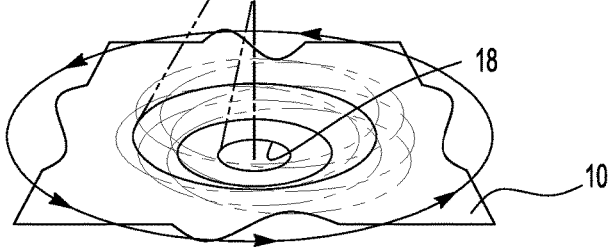

As is known to those of skill in the art, the valve seat 14 circumscribes each of the plurality of bores 12 defined by the engine head 10. The nozzle 30 relatively circumferentially traverses each bore 12 to apply the second composition defining the valve seat 14. This is best represented in FIGS. 5A and 5B. In one embodiment best represented in FIG. 5A, the engine head 10 is stationary and the nozzle 30 and laser beam 34 circumscribes the bore 12 to apply the second composition defining the valve seat 14. In an alternative embodiment shown in FIG. 5B, the nozzle 30 and laser beam 34 are stationary and the engine head 10 pivots around a bore axis aligning the laser beam 34 with the valve seat groove 20 to apply the second composition defining the valve seat 14.

Figure 6:
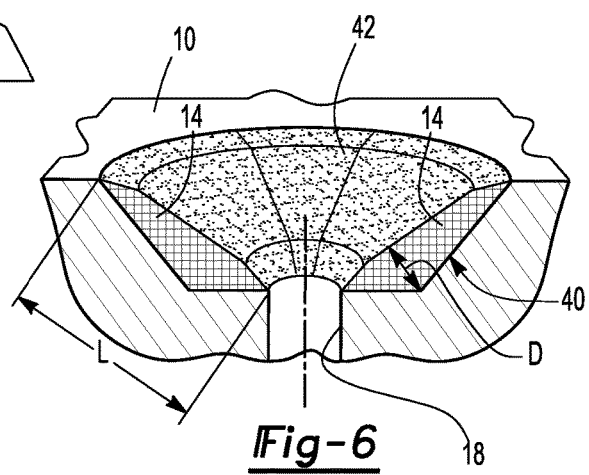
FIG. 6 shows a cross-sectional view of machined valve seat.

Referring now to FIG. 6, a complete application of the second composition is represented as a bead 42 having a geometric configuration proximate the desired geometric configuration of the valve seat 14 as represented by the perforated line of FIG. 6. A precise geometric configuration required of the valve seat 14 is obtained by machining the bead 42 to the desired geometric configuration shown FIG. 6.

As set forth above, it is desirable to provide a deposited valve seat 14 having substantially similar heat conductivity to that of the aluminum engine head 10. However, it is still required that the second composition comprising the valve seat provides sufficient hardness and durability to withstand the rigors of an internal combustion engine. As such, a first chemical composition is included below:

A first embodiment of the second chemical composition includes the following percent by weight elemental ranges:
  copper in the amount of 40-50 percent by weight;
  cobalt in the amount of 15-25 percent by weight;
  carbon in the amount of less than 0.1 percent by weight;
  chromium in the amount of 7-10 percent by weight;
  molybdenum in the amount of 8-12 percent by weight;
  nickel in the amount of 10-15 percent by weight;
  silicon in the amount of 2-5 percent by weight;
  iron in the amount of less than 1.5 percent by weight;
  hafnium in the amount of less than 1.5 percent by weight;
  niobium in the amount of 0.5-2 percent by weight;
  manganese in the amount of less than 2 percent by weight In one experimental composition A, a target weight percent of the elements forming the first embodiment of the second composition include:
  copper in the amount of 42.10 percent by weight;
  cobalt in the amount of 19.80 percent by weight;
  carbon in the amount of 0.10 percent by weight;
  chromium in the amount of 8.60 percent by weight;
  molybdenum in the amount of 10.00 percent by weight;
  nickel in the amount of 12.80 percent by weight;
  silicon in the amount of 2.90 percent by weight;
  iron in the amount of 0.70 percent by weight;
  hafnium in the amount of 0.90 percent by weight;
  niobium in the amount of 1.10 percent by weight;
  manganese in the amount of 1.10 percent by weight The copper based alloy of composition A provides the high thermal conductivity of copper leading to a lower temperature for the valve seat and enabling a higher efficiency of the engine. Several laves phase formers such as molybdenum, niobium and iron are added for creation of hard phases for wear resistance. Presence of Carbon allows formation of carbides in combination with chromium, molybdenum and/or niobium to provide further hardness. Nickel provides solid solution strengthening and cobalt provides hot hardness property. Hafnium is included to scavenge oxygen.

A second embodiment of the second chemical composition includes the following percent by weight elemental ranges:
  aluminum in the amount of 50-66 percent by weight;
  copper in the amount of 20-30 percent by weight;
  silicon in the amount of 5-12 percent by weight;
  iron in the amount of 5-12 percent by weight;

manganese in the amount of less than 1.5 percent by weight;
zirconium in the amount of less than 2.0 percent by weight;
magnesium in the amount of less than 2.0 percent by weight;
germanium in the amount of less than 2.0 percent by weight In an experimental composition B, a target weight percent of the elements forming the first embodiment of the second composition include:
aluminum in the amount of 66.00 percent by weight;
copper in the amount of 8.00 percent by weight;
silicon in the amount of 9.00 percent by weight;
iron in the amount of 15.00 percent by weight;
manganese in the amount of 0.50 percent by weight;
zirconium in the amount of 0.50 percent by weight;
magnesium in the amount of 0.50 percent by weight;
germanium in the amount of 0.50 percent by weight The high thermal conductivity of aluminum leads to a lower temperature for the valve seat and allows higher efficiency of the engine. Presence of alloying elements such as silicon, copper and iron forms hard intermetallic phases providing the superior wear resistance for the valve seat. Manganese, zirconium, Magnesium and germanium may or may not be present for as additional strengtheners.

As set forth above, it was discovered that establishing a thermal conductivity for the valve seat 14 to be generally equal to or greater than the engine head 10 alloy composition efficient heat transfer making use of the cooling apparatus 16 of the engine head 10 could be achieved. The table below sets forth the relevant Thermal conductivity and specific heat capacity of the experimental compositions A and B.

| Properties | Unit | Stainless Steel insert | Aluminum Base Alloy B | Copper Base Alloy A |
|---|---|---|---|---|
| Density | g/cc | 7.74 | 3.99 | 8.736 |
| Thermal Conductivity | w/m-K | 24.90 | 215.20 | 227.912 |
| Sp. Heat Capacity | J/g-K | 0.46 | 0.76 | 0.399 |

The unique chemical composition and processing characteristics of the present application provide additional benefits to that of improved heat transfer and thermal conductivity. The valve seat 14 is thinner than prior art valve seats. For example, the valve seat includes a depth D of between about 0.5 mm and 4 mm while prior art valves seat are more up to 8 mm. Additionally, the ration of length L to depth D is unique ranging from about one to ten.

The invention has been described in an illustrative manner, and it is to be understood that the terminology that has been used is intended to be in the nature of words of description rather than of limitation. Obviously, many modifications and variations of the present invention are possible in light of the above teachings. It is therefore to be understood that within the specification, the reference numerals are merely for convenience, and are not to be in any way limiting, the invention may be practiced otherwise than is specifically described.

What is claimed is:

1. A method of forming a valve seat of an engine head formed from a first composition includes the steps of:
  forming a groove at a predetermined valve seat location of a bore defined by said engine head;
  providing a source of directed heat energy;
  preheating at least said valve seat location to about a temperature of the melting point of the first composition with the source of directed heat energy;
  infusing the source of directed heat energy with a material having a second composition and generating a melt pool upon the groove by direct metal deposition, with the melt pool including the second composition; and
  said second composition including a heat conductivity generally equal to or greater than a heat conductivity of the first composition for providing efficient transfer of heat energy from the first composition to the second composition,
  wherein said step of infusing the source of directed heat energy with a material having a second composition is further defined by providing a second composition comprising:
  aluminum in the amount of 50-66 percent by weight;
  copper in the amount of 20-30 percent by weight;
  silicon in the amount of 5-12 percent by weight;
  iron in the amount of 5-12 percent by weight;
  manganese in the amount of less than 1.5 percent by weight;
  zirconium in the amount of less than 2.0 percent by weight;
  magnesium in the amount of less than 2.0 percent by weight;
  germanium in the amount of less than 2.0 percent by weight.

2. The method set forth in claim 1, wherein said step of preheating at least said valve seat location to about a temperature of the melting point is further defined by melting a surface of the valve seat location.

3. The method set forth in claim 2, wherein said step of preheating a surface of the valve seat location is further defined by raising a temperature of the valve seat to between about 250° C. and 450° C.

4. The method set forth in claim 1, further including the step of melting a surface of the valve seat location by raising the temperature of the valve seat location to between about 550° C. and 660° C.

5. The method set forth in claim 1, further including the step of preheating of the engine head for slowing the rate of cooling after direct metal deposition of the second composition onto the valve seat location.

6. The method set forth in claim 1, wherein said step of direct metal deposition is further defined by rotating a direct metal deposition nozzle relative to a valve seat of an engine block.

7. The method set forth in claim 1 wherein said step of direct metal deposition is further defined by rotating the valve seat of the engine block relative to a direct metal deposition nozzle.

8. The method set forth in claim 1, wherein said step of providing a source of directed heat energy is further defined by providing a laser beam, a plasma torch, or a TIG welding torch.

9. The method set forth in claim 1, further including the step of cooling the melt pool including the second composition thereby forming the valve seat and machining the cooled melt pool to a predetermined geometric shape.

10. The method set forth in claim 1, wherein said step of forming a groove is further defined by forming a groove having a generally constant radius of between about three and ten millimeters having a chamfered wall with an angle ranging between about 30° and 70°.

11. The method set forth in claim 1, further including the step of machining the second composition after the second composition has cooled.

12. The method set forth in claim 11, wherein said step of machining the second composition is further defined by machining a plurality of chamfers into the second composition.

13. The method set forth in claim 1, further including the step of machining the second composition to a length L to depth D ratio ranging from one to ten.

14. The method set forth in claim 1, further including the step of machining the second composition to a maximum depth D of about 0.5mm to 4mm.

\* \* \* \* \*